United States Patent
Cai et al.

(10) Patent No.: US 9,854,522 B2
(45) Date of Patent: *Dec. 26, 2017

(54) SYSTEM AND METHOD FOR SEMI-PERSISTENT AND DYNAMIC SCHEDULING AND DISCONTINUOUS RECEPTION CONTROL

(71) Applicant: BlackBerry Limited, Waterloo (CA)

(72) Inventors: Zhijun Cai, Ashburn, VA (US); James Earl Womack, Bedford, TX (US)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/262,892

(22) Filed: Sep. 12, 2016

(65) Prior Publication Data

US 2016/0381634 A1    Dec. 29, 2016

Related U.S. Application Data

(63) Continuation of application No. 14/559,711, filed on Dec. 3, 2014, now Pat. No. 9,467,979, which is a
(Continued)

(51) Int. Cl.
*G08C 17/00* (2006.01)
*H04J 3/00* (2006.01)
(Continued)

(52) U.S. Cl.
CPC ... *H04W 52/0219* (2013.01); *H04W 52/0216* (2013.01); *H04W 72/04* (2013.01);
(Continued)

(58) Field of Classification Search
CPC .............................. H04W 52/0219
See application file for complete search history.

(56) References Cited

U.S. PATENT DOCUMENTS 5,649,298 A    7/1997  Ablay
5,991,279 A    11/1999 Haugli et al.
(Continued)

FOREIGN PATENT DOCUMENTS

CA    2344911 A1    12/2001
EP    0529269 A2    3/1993
(Continued)

OTHER PUBLICATIONS

Final Office Action dated Jun. 13, 2014; U.S. Appl. No. 11/958,547, filed Dec. 18, 2007; 27 pages.
(Continued)

*Primary Examiner* — Gerald Smarth
(74) *Attorney, Agent, or Firm* — Conley Rose, P.C.; J. Robert Brown, Jr.

(57) ABSTRACT

Methods of combining semi-persistent resource allocation and dynamic resource allocation are provided. Packets, such as VoIP packets, are transmitted on the uplink and downlink using respective semi-persistent resources. For each mobile device, awake periods and sleep periods are defined. The semi-persistent resources are aligned with the awake periods so that most of the time the mobile device can turn off its wireless access radio during the sleep periods. In addition, signalling to request, and to allocate, resources for additional packets are transmitted during the awake periods, and the resources allocated for the additional packets are within the awake windows.

19 Claims, 8 Drawing Sheets

Related U.S. Application Data continuation of application No. 11/958,547, filed on Dec. 18, 2007, now Pat. No. 8,964,650.

(60) Provisional application No. 60/944,383, filed on Jun. 15, 2007.

(51) Int. Cl.
    *H04W 52/02* (2009.01)
    *H04W 76/04* (2009.01)
    *H04W 72/04* (2009.01)
    *H04W 72/12* (2009.01)

(52) U.S. Cl.
    CPC ....... *H04W 72/12* (2013.01); *H04W 72/1263* (2013.01); *H04W 76/048* (2013.01); *H04Q 2213/13034* (2013.01); *H04Q 2213/13098* (2013.01); *H04Q 2213/13332* (2013.01); *H04Q 2213/13389* (2013.01); *H04W 52/0274* (2013.01); *Y02B 60/50* (2013.01)

(56) References Cited

U.S. PATENT DOCUMENTS

| | | |
|---|---|---|
| 6,104,929 A | 8/2000 | Josse et al. |
| 6,545,996 B1 | 4/2003 | Falco et al. |
| 6,622,251 B1 | 9/2003 | Lindskog et al. |
| 6,765,896 B1 | 7/2004 | Ahmed et al. |
| 6,917,598 B1 | 7/2005 | Emeott et al. |
| 6,973,052 B2 | 12/2005 | Wang et al. |
| 6,975,629 B2 | 12/2005 | Welin |
| 7,027,400 B2 | 4/2006 | O'Neill |
| 7,142,810 B2 | 11/2006 | Oesterling |
| 7,221,945 B2 | 5/2007 | Milford et al. |
| 7,366,124 B2 | 4/2008 | Lee et al. |
| 7,372,818 B2 | 5/2008 | Fraser et al. |
| 7,433,297 B2 | 10/2008 | Barton et al. |
| 7,505,751 B1 | 3/2009 | Backes |
| 7,596,366 B2 | 9/2009 | Van Bosch et al. |
| 7,899,003 B2 | 3/2011 | Xu |
| 8,270,932 B2 | 9/2012 | Kim et al. |
| 8,325,621 B2 | 12/2012 | Simonsson et al. |
| 8,964,650 B2 | 2/2015 | Cai et al. |
| 9,351,249 B2 | 5/2016 | Somasundaram et al. |
| 9,467,979 B2 | 10/2016 | Cai et al. |
| 2002/0064140 A1 | 5/2002 | Numminen |
| 2002/0154611 A1 | 10/2002 | Khullar |
| 2003/0021243 A1 | 1/2003 | Hamalainen |
| 2003/0039218 A1 | 2/2003 | Kwak |
| 2003/0123598 A1 | 7/2003 | Gollamudi et al. |
| 2003/0137969 A1 | 7/2003 | Abdesselem et al. |
| 2003/0157887 A1 | 8/2003 | Willenegger |
| 2003/0157899 A1 | 8/2003 | Trossen et al. |
| 2003/0185162 A1 | 10/2003 | Fraser et al. |
| 2004/0013095 A1 | 1/2004 | Western et al. |
| 2004/0042492 A1 | 3/2004 | Suzuki et al. |
| 2004/0093174 A1 | 5/2004 | Lander |
| 2004/0100911 A1 | 5/2004 | Kwan et al. |
| 2004/0114922 A1 | 6/2004 | Hardee |
| 2004/0151144 A1 | 8/2004 | Benveniste |
| 2004/0185918 A1 | 9/2004 | Fan et al. |
| 2004/0196801 A1 | 10/2004 | Hiramatsu |
| 2004/0198371 A1 | 10/2004 | Balasubramanian et al. |
| 2004/0198411 A1 | 10/2004 | Cheng et al. |
| 2004/0210619 A1 | 10/2004 | Balachandran et al. |
| 2004/0253996 A1 | 12/2004 | Chen et al. |
| 2004/0264397 A1 | 12/2004 | Benveniste |
| 2004/0264433 A1 | 12/2004 | Melpignano |
| 2005/0007968 A1 | 1/2005 | Hsu et al. |
| 2005/0009578 A1 | 1/2005 | Liu |
| 2005/0047357 A1 | 3/2005 | Benveniste |
| 2005/0047387 A1 | 3/2005 | Frederiksen et al. |
| 2005/0063330 A1 | 3/2005 | Lee et al. |
| 2005/0063331 A1 | 3/2005 | Kim et al. |
| 2005/0113099 A1 | 5/2005 | Eriksson et al. |
| 2005/0128998 A1 | 6/2005 | Jelitto et al. |
| 2005/0135302 A1 | 6/2005 | Wang et al. |
| 2005/0180324 A1 | 8/2005 | Niemela et al. |
| 2005/0180325 A1 | 8/2005 | Niemela et al. |
| 2005/0180378 A1 | 8/2005 | Lee et al. |
| 2005/0181731 A1 | 8/2005 | Asghar et al. |
| 2005/0201353 A1 | 9/2005 | Lee et al. |
| 2005/0254444 A1 | 11/2005 | Meier et al. |
| 2005/0254459 A1 | 11/2005 | Qian |
| 2005/0281222 A1 | 12/2005 | Ranta-Aho et al. |
| 2006/0019641 A1 | 1/2006 | Vayanos et al. |
| 2006/0031404 A1 | 2/2006 | Kassab |
| 2006/0187897 A1 | 8/2006 | Dabbs, III et al. |
| 2006/0209669 A1 | 9/2006 | Nishio |
| 2006/0252449 A1 | 11/2006 | Ramesh |
| 2006/0256732 A1 | 11/2006 | Hamalainen |
| 2007/0004374 A1 | 1/2007 | Kneckt |
| 2007/0027920 A1 | 2/2007 | Alvarado et al. |
| 2007/0060167 A1 | 3/2007 | Damnjanovic et al. |
| 2007/0061433 A1 | 3/2007 | Reynolds et al. |
| 2007/0082620 A1 | 4/2007 | Zhang et al. |
| 2007/0087724 A1 | 4/2007 | Jang et al. |
| 2007/0135081 A1 | 6/2007 | Bultan et al. |
| 2007/0177630 A1 | 8/2007 | Ranta et al. |
| 2007/0201438 A1 | 8/2007 | Yoon et al. |
| 2007/0206524 A1 | 9/2007 | Suk |
| 2007/0230394 A1 | 10/2007 | Wang et al. |
| 2007/0254603 A1 | 11/2007 | Li et al. |
| 2007/0268861 A1 | 11/2007 | Diachina et al. |
| 2007/0286080 A1 | 12/2007 | Kim et al. |
| 2007/0286155 A1 | 12/2007 | Kaikkonen et al. |
| 2007/0291673 A1 | 12/2007 | Demirhan et al. |
| 2008/0019327 A1 | 1/2008 | Kwon et al. |
| 2008/0090583 A1 | 4/2008 | Wang et al. |
| 2008/0095252 A1 | 4/2008 | Kim et al. |
| 2008/0101268 A1 | 5/2008 | Sammour et al. |
| 2008/0117891 A1 | 5/2008 | Damnjanovic et al. |
| 2008/0123575 A1 | 5/2008 | Jaakkola |
| 2008/0133708 A1 | 6/2008 | Alvarado et al. |
| 2008/0151828 A1 | 6/2008 | Bjorken et al. |
| 2008/0159183 A1* | 7/2008 | Lindoff ................ H04L 1/1664 370/278 |
| 2008/0167089 A1 | 7/2008 | Suzuki et al. |
| 2008/0181127 A1 | 7/2008 | Terry et al. |
| 2008/0186893 A1 | 8/2008 | Kolding et al. |
| 2008/0186944 A1 | 8/2008 | Suzuki et al. |
| 2008/0192674 A1 | 8/2008 | Wang et al. |
| 2008/0192703 A1 | 8/2008 | Suzuki |
| 2008/0207229 A1 | 8/2008 | Cave et al. |
| 2008/0219376 A1 | 9/2008 | Qi et al. |
| 2008/0225772 A1 | 9/2008 | Xu |
| 2008/0232284 A1 | 9/2008 | Dalsgaard et al. |
| 2008/0232310 A1 | 9/2008 | Xu |
| 2008/0267105 A1 | 10/2008 | Wang et al. |
| 2008/0267118 A1 | 10/2008 | Cai et al. |
| 2008/0267168 A1 | 10/2008 | Cai et al. |
| 2008/0268863 A1 | 10/2008 | Pedersen et al. |
| 2008/0279170 A1 | 11/2008 | Malladi et al. |
| 2008/0287091 A1 | 11/2008 | Suzuki et al. |
| 2008/0287149 A1 | 11/2008 | Womack et al. |
| 2008/0310333 A1* | 12/2008 | Balachandran ....... H04L 1/1812 370/310 |
| 2008/0310356 A1 | 12/2008 | Cai et al. |
| 2008/0310400 A1 | 12/2008 | Cai et al. |
| 2008/0311919 A1 | 12/2008 | Whinnett et al. |
| 2008/0311946 A1 | 12/2008 | Britton |
| 2008/0313300 A1 | 12/2008 | Alanara et al. |
| 2009/0006873 A1 | 1/2009 | Bellofatto et al. |
| 2009/0029671 A1 | 1/2009 | Cho et al. |
| 2009/0034452 A1 | 2/2009 | Somasundaram et al. |
| 2009/0046627 A1 | 2/2009 | Xu |
| 2009/0046639 A1 | 2/2009 | Cai et al. |
| 2009/0054006 A1 | 2/2009 | Cai et al. |
| 2009/0073907 A1 | 3/2009 | Cai |
| 2009/0180414 A1 | 7/2009 | Maeda et al. |
| 2009/0186614 A1 | 7/2009 | Aoyama et al. |
| 2009/0252089 A1 | 10/2009 | Lim et al. |
| 2009/0274107 A1 | 11/2009 | Park et al. |
| 2009/0310586 A1 | 12/2009 | Shatti |

(56) References Cited

U.S. PATENT DOCUMENTS

| | | | |
|---|---|---|---|
| 2009/0327828 | A1 | 12/2009 | Ojala et al. |
| 2010/0113054 | A1 | 5/2010 | Iwamura et al. |
| 2010/0142485 | A1 | 6/2010 | Lee et al. |
| 2010/0182965 | A1 | 7/2010 | Sebire |
| 2010/0184443 | A1 | 7/2010 | Xu |
| 2010/0202382 | A1 | 8/2010 | Park et al. |
| 2010/0279715 | A1 | 11/2010 | Alanara et al. |
| 2010/0309798 | A1 | 12/2010 | Fodor et al. |
| 2011/0051657 | A1 | 3/2011 | Li et al. |
| 2013/0021935 | A1 | 1/2013 | Chun et al. |

FOREIGN PATENT DOCUMENTS

| | | | |
|---|---|---|---|
| EP | 0924890 | A2 | 6/1999 |
| EP | 1289181 | A1 | 3/2003 |
| EP | 1317156 | A1 | 6/2003 |
| EP | 1345349 | A2 | 9/2003 |
| EP | 1450240 | A2 | 8/2004 |
| EP | 1492263 | A1 | 12/2004 |
| JP | 2010515334 | A | 5/2010 |
| KR | 20020002305 | A | 1/2002 |
| KR | 20040050422 | A | 6/2004 |
| WO | 0021236 | A1 | 4/2000 |
| WO | 0186885 | A1 | 11/2001 |
| WO | 02033875 | A1 | 4/2002 |
| WO | 03096707 | A2 | 11/2003 |
| WO | 2004004194 | A2 | 1/2004 |
| WO | 2005022772 | A1 | 3/2005 |
| WO | 2005064952 | A1 | 7/2005 |
| WO | 2006002379 | A2 | 1/2006 |
| WO | 2006046754 | A1 | 5/2006 |
| WO | 2006103498 | A1 | 10/2006 |
| WO | 2006114710 | A2 | 11/2006 |
| WO | 2007014021 | A2 | 2/2007 |
| WO | 2007025138 | A2 | 3/2007 |
| WO | 2007073118 | A1 | 6/2007 |
| WO | 2007089797 | A2 | 8/2007 |

OTHER PUBLICATIONS

Advisory Action dated Sep. 5, 2014; U.S. Appl. No. 11/958,547, filed Dec. 18, 2007; 3 pages.

Notice of Allowance dated Oct. 7, 2014, 2014; U.S. Appl. No. 11/958,547, filed Dec. 18, 2007; 33 pages.

Office Action dated Jan. 29, 2016; U.S. Appl. No. 14/559,711, filed Dec. 3, 2014; 40 pages.

Notice of Allowance dated Jul. 7, 2016; U.S. Appl. No. 14/559,711, filed Dec. 3, 2014; 10 pages.

Office Action dated Jun. 15, 2011; U.S. Appl. No. 11/741,571, filed Apr. 27, 2007; 31 pages.

Final Office Action dated Dec. 5, 2011; U.S. Appl. No. 11/741,571, filed Apr. 27, 2007; 32 pages.

Office Action dated Jan. 31, 2011; U.S. Appl. No. 11/957,624, filed Dec. 17, 2007; 19 pages.

Final Office Action dated May 11, 2011; U.S. Appl. No. 11/957,624, filed Dec. 17, 2007; 12 pages.

Office Action dated Oct. 28, 2011; U.S. Appl. No. 11/957,624, filed Dec. 17, 2007; 19 pages.

Office Action dated Mar. 1, 2011; U.S. Appl. No. 11/969,082, filed Jan. 3, 2008; 29 pages.

Office Action dated Mar. 2, 2011; U.S. Appl. No. 11/968,518, filed Jan. 2, 2008; 34 pages.

Office Action dated Oct. 7, 2011; U.S. Appl. No. 11/966,074, filed Dec. 28, 2007; 36 pages.

Office Action dated Dec. 12, 2011; U.S. Appl. No. 13/287,731, filed Nov. 2, 2011; 12 pages.

PCT International Search Report; Application No. PCT/CA2007/002299; dated May 21, 2008; 2 pages.

PCT International Search Report; Application No. PCT/CA2007/002311; dated Mar. 13, 2008; 3 pages.

PCT International Search Report; Application No. PCT/CA2007/002368; dated Apr. 17, 2008; 3 pages.

PCT International Search Report; Application No. PCT/CA2008/000003; dated Apr. 17, 2008; 2 pages.

PCT International Search Report; Application No. PCT/CA2008/000001; dated Apr. 24, 2008; 2 pages.

PCT International Search Report; Application No. PCT/CA2008/000771; dated Aug. 1, 2008; 2 pages.

PCT International Search Report; Application No. PCT/CA2008/000770; dated Aug. 8, 2008; 3 pages.

PCT International Search Report; Application No. PCT/US2008/073580; dated Dec. 26, 2008; 2 pages.

PCT International Search Report; Application No. PCT/US2008/073585; dated Feb. 6, 2009; 3 pages.

PCT International Search Report; Application No. PCT/US2008/073593; dated Feb. 28, 2009; 2 pages.

European Extended Search Report; Application No. 07107587.3; dated Aug. 22, 2007; 2 pages.

European Extended Search Report; Application No. 07108885.0; dated Dec. 4, 2007; 2 pages.

European Extended Search Report; Application No. 08162638.4; dated Nov. 25, 2008; 8 pages.

European Extended Search Report; Application No. 08162639.2; dated Dec. 4, 2008; 2 pages.

European Extended Search Report; Application No. 08162615.2; dated Dec. 5, 2008; 2 pages.

European Partial Search Report; Application No. 11176042.7; dated Aug. 24, 2011; 7 pages.

European Extended Search Report; Application No. 11186713.1; dated Dec. 6, 2011; 3 pages.

European Extended Search Report; Application No. 08733534.5; dated Nov. 14, 2011; 13 pages.

European Extended Search Report; Application No. 11186711.5; dated Nov. 25, 2011; 8 pages.

Australian Notice of Acceptance; Application No. 2007354841; dated Nov. 11, 2011; 3 pages.

Japanese Office Action; Application No. 2010-511453; dated Mar. 2, 2012; 4 pages.

Mexican Office Action as Received in Co-pending Application No. MX/a/2012/013598 dated Jun. 2, 2015; 2 pages. (No English translation available).

3GPP TSG RAN WG2 #56; "Uplink Scheduling for VoIP"; R2-063273; Riga, Latvia; Nov. 6-10, 2006; 3 pages.

3GPP TSG-RAN2 #54; "Uplink Scheduling Request for Real Time Services"; R2-062227; Tallinn, Estonia; Aug. 28-Sep. 1, 2006; 5 pages.

3GPP TSG RAN WG2 #55; "Comparison of Persistent Resource Allocation Schemes in LTE Uplink"; R2-060283; Riga, Latvia; Jan. 15-19, 2007; 5 pages.

3GPP TSG RAN WG2 #54; "Uplink Resource Allocation Scheme"; R2-062164; Tallinn, Estonia; Aug. 28-Sep. 1, 2006; 5 pages.

3GPP TSG RAN WG1 #48; "VoIP Support in LTE"; R1-070961; St. Louis, Missouri, USA; Feb. 12-16, 2007; 6 pages.

3GPP TSG RAN WG1 Meeting #48bis; "DL Control Signaling and Multiplexing for VoIP"; R1-071721; St. Julians, Malta; Mar. 26-30, 2007; 4 pages.

3GPP TSG-RAN WG2 Meeting #37; "RTCP Removal"; R2-031746; Budapest, Hungary; Aug. 25-29, 2003; 2 pages.

3GPP TSG-RAN WG2 Meeting #58; "DRX Control for LTE_ACTIVE and VoIP"; R2-071818; Kobe, Japan; May 7-11, 2007; 2 pages.

3GPP TSG-RAN WG2 Meeting #58-bis; "Peformance Gains of the Semi-Autonomous DRX Scheme for LTE"; R2-072557; Orlando, U.S.; Jun. 25-29, 2008; 6 pages.

3GPP TSG-RAN WG2 Meeting #58; "Further Considerations on DL Semi-Persistent Scheduling"; R2-071743; Kobe, Japan; May 7-11, 2007; 3 pages.

3GPP TSG-RAN-WG2 Meeting #59; "Semi-Persistent Scheduling and DRX Control"; R2-073245; Athens, Greece; Aug. 20-24, 2007; 5 pages.

TSG-RAN WG2 Meeting #55; "Semi Persistent Scheduling"; R2-062859; Seoul, Korea; Oct. 9-13, 2006; 5 pages.

(56) References Cited

OTHER PUBLICATIONS

TSG-RAN WG2 Meeting #59; "DRx and VoIP"; R2-073208; Athens, Greece; Aug. 20-24, 2007; 3 pages.
3GPP TSG-RAN WG2 Meeting #56bis; "Scheduling of LTE DL VoIP"; R2-070006; Sorrento, Italy; Jan. 15-19, 2007; 4 pages.
3GPP TSG-RAN-WG2 Meeting #58bis; "Uplink VoIP Scheduling with Fast Indication"; R2-071961; Kobe, Japan; May 1-11, 2007; 4 pages.
TSG-RAN WG2 Meeting #57; "Comparison of Scheduling Methods for LTE"; R2-070796; St. Louis, USA; Feb. 12-16, 2007; 5 pages.
TSG-RAN WG1 #46bis; "Semi-persistent Scheduling"; R1-062863; Seoul, Korea; Oct. 9-13, 2006; 5 pages.
3GPP TSG-RAN-WG2 Meeting #58-bis; "Semi-persistent Scheduling and DRX Control"; R2-072777; Orlando, USA; Jun. 25-29, 2007; 5 pages.
3GPP TSG-RAN-WG2 Meeting #58-bis; "Large IP Packet Delivery During VoIP Session"; R2-072776; Orlando, USA; Jun. 25-29, 2007; 3 pages.
3GPP TSG RAN WG1 #49; "Uplink Grant Capacity in Response to RAN2 LS"; R1-072532; Kobe, Japan; May 7-11, 2007; 7 pages.
3GPP TSG-RAN WG2 #55; "Persistent Scheduling and Dynamic Allocation"; R2-062788; Seoul, Korea; Oct. 9-13, 2006; 6 pages.
3GPP TSG RAN WG2 Ad Hoc on LTE; "Persistent Scheduling"; R2-061920; Cannes, France; Jun. 27-30, 2006; 5 pages.
Fukui, Noriyuki; "Study of Channel Quality Feedback in UMTS HSDPA"; The 14th IEEE 2003 International Symposium of Personal, Indoor and Mobile Radio Communication Proceedings; Sep. 2003; 5 pages.
Jeon, Soo-Yong, et al.; "Channel Adaptive CQI Reporting Schemes for UMTS High-Speed Downlink Packet Access"; IEEE; Sep. 2006; 5 pages.
Jiang, Dajie, et al.; "Principle and Performance of Semi-persistent Scheduling for VoIP in LTE System"; IEEE; Sep. 2007; 4 pages.
Döttling, Martin, et al.; "Efficient Channel Quality Feedback Schemes for Adaptive Modulation and Coding of Packet Data"; IEEE; Sep. 2004; 5 pages.
Melnyk, Miguel, et al.; "An Analysis of Session Setup Time in Internet Multimedia Subsystem (IMS) with EV-DO (Rev. A) Wireless Links"; IEEE; 2005; 5 pages.
Yang, Shun-Ren, et al.; "Modeling UMTS Discontinuous Reception Mechanism"; IEEE Transactions on Wireless Communications; vol. 4, Issue No. 1; Jan. 2005; 8 pages.
Wu, Dan, et al.; "Blind Signal-to-Noise Ratio Estimation Algorithm with Small Samples for Wireless Digital Communications"; Lecture Notes in Control and Information Sciences; vol. 345; 2006; 8 pages.
Office Action dated Mar. 16, 2011; U.S. Appl. No. 11/958,547, filed Dec. 18, 2007; 35 pages.
Final Office Action dated Nov. 8, 2011; U.S. Appl. No. 11/958,547, filed Dec. 18, 2007; 38 pages.
Advisory Action dated Jan. 27, 2012; U.S. Appl. No. 11/958,547, filed Dec. 18, 2007; 11 pages.
Office Action dated Dec. 9, 2013; U.S. Appl. No. 11/958,547, filed Dec. 18, 2007; 62 pages.

\* cited by examiner

SYSTEM AND METHOD FOR SEMI-PERSISTENT AND DYNAMIC SCHEDULING AND DISCONTINUOUS RECEPTION CONTROL

RELATED APPLICATIONS

This application is a continuation of U.S. patent application Ser. No. 14/559,711 filed Dec. 3, 2014, which is a continuation of U.S. Pat. No. 8,964,650 issued on Feb. 24, 2015, which claims the benefit of U.S. Provisional Application No. 60/944,383 filed on Jun. 15, 2007 all of which are incorporated herein by reference as if reproduced in their entirety.

FIELD OF THE APPLICATION

The application relates to wireless communication, and more particularly to transmission scheduling for wireless communication.

BACKGROUND

With semi-persistent scheduling, for downlink VoIP (voice over IP (Internet Protocol)) communications to a mobile device, a periodic DL (downlink) transmission resource is allocated during a talk-spurt on the downlink. The same resource is allocated each time. The allocation is turned on during each of the talk-spurts and off between talk-spurts. In this manner, explicit signalling to request an allocation, and to grant a particular VoIP allocation is not required. Semi-persistent scheduling for uplink VoIP communications from a mobile station is similar.

In addition to regular VoIP traffic, mobile devices also need the ability to send and transmit larger IP packets. Such larger IP packets are likely to be relatively infrequent compared to the frequency of regular VoIP transmissions. Such packets might include uncompressed IP packets, RTCP (Remote Transmit Power Control) packets, SIP/SDP (Session Initiation Protocol/Session Description Protocol) packets, etc. Such IP packets may be several hundreds of bytes in size and may have high priority. In addition, larger packets may be required to transmit RRC (Radio Resource Control) Signalling messages. Examples of this are handover related messages such as measurement reports. Some mobile devices will also need the ability to deliver a mixed service in which case services in addition to VoIP need to be provided to the mobile device, such as e-mail, web browsing etc.

BRIEF DESCRIPTION OF THE DRAWINGS

Embodiments will now be described with reference to the attached drawings in which.

DETAILED DESCRIPTION OF EMBODIMENTS

Figure 1:
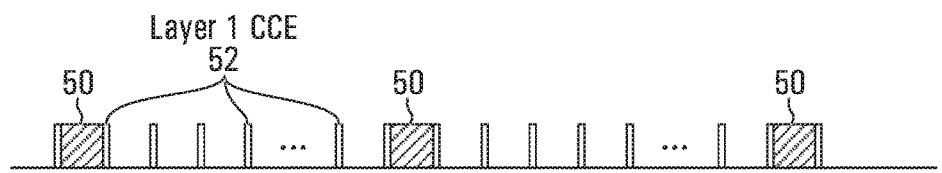
FIG. 1 is a signalling diagram showing dynamic scheduling vs. semi-persistent scheduling.

According to one broad aspect, the application provides a method in a wireless network, the method comprising: for each mobile device of a plurality of mobile devices, in order to transmit to the mobile device the wireless network: a) transmitting downlink packets to the mobile device using a semi-persistent downlink transmission resource that is aligned with awake periods defined for the mobile device; b) for each additional downlink packet or sub-packet for the mobile device: i) dynamically allocating an additional downlink transmission resource to transmit the additional packet or sub-packet, the additional resource being allocated to occur within one of the awake periods defined for the mobile device; ii) during one of the awake periods defined for the mobile device, transmitting signaling that defines the additional downlink transmission resource to transmit the additional packet or sub-packet; iii) during one of the awake periods defined for the mobile device, transmitting the additional downlink packet using the additional downlink resource.

According to another broad aspect, the application provides a method in a mobile device, the method comprising: controlling a reception capability of the mobile device during a plurality of awake periods and a plurality of sleep periods, the awake periods alternating in time with the sleep periods, such that the reception capability is always on during each of the awake periods, and the reception capability is off for at least some of the sleep periods; receiving at the mobile device downlink packets on a semi-persistent downlink transmission resource that is aligned with the plurality of awake periods defined for the mobile device; for each additional downlink packet or sub-packet for the mobile device: i) during one of the awake periods, receiving signaling that defines an additional downlink transmission resource to transmit the additional downlink packet or sub-packet; ii) during one of the awake periods, receiving the additional downlink packet or sub-packet on the additional downlink resource.

According to another broad aspect, the application provides a wireless network comprising: a semi-persistent scheduler for allocating a semi-persistent downlink resource that is aligned with awake periods defined for a mobile device for transmissions to the mobile device; a transmitter configured to: a) transmit downlink packets to the mobile device using the semi-persistent downlink transmission resource allocated by the semi-persistent scheduler; b) for each additional downlink packet or sub-packet for the mobile device: i) during one of the awake periods defined for the mobile device, transmit signaling that defines a respective additional downlink transmission resource to transmit the additional packet or sub-packet; ii) during one of the awake periods defined for the mobile device, transmit the additional downlink packet using the respective additional downlink resource; a dynamic scheduler for dynamically allocating the respective additional downlink transmission resource to transmit each additional packet or sub-packet, the additional resource being allocated to occur within one of the awake periods defined for the mobile device.

According to another broad aspect, the application provides a mobile device comprising: a wireless access radio; a radio manager for controlling a reception capability of the wireless access radio during a plurality of awake periods and a plurality of sleep periods, the awake periods alternating in time with the sleep periods, such that the reception capability is always on during each of the awake periods, and the reception capability is off for at least some of the sleep periods; the mobile device being configured to: receive downlink packets on a semi-persistent downlink transmission resource that is aligned with the plurality of awake periods defined for the mobile device; for each additional downlink packet or sub-packet for the mobile device: i) during one of the awake periods, receive signaling that defines an additional downlink transmission resource to transmit the additional downlink packet or sub-packet; ii) during one of the awake periods, receive the additional downlink packet or sub-packet on the additional downlink resource.

Further aspects provide wireless networks, base stations, wireless devices that execute one or more of the methods summarized above or detailed herein. Another embodiment provides a computer readable medium having computer readable instructions for controlling the execution of one or more of the methods summarized above or detailed herein.

Dynamic scheduling has been proposed to allow the dynamic allocation of transmission resources, and the subsequent transmission of a large packet using the dynamically allocated resources. Dynamic scheduling involves allocating a resource each time a packet is to be transmitted, and the resource can differ for each allocation. In a particular example, see Applicant's U.S. Provisional Patent Application No. 60/944,376 filed on Jun. 15, 2007 and hereby incorporated by reference in its entirety.

In a specific example, a mobile device supporting VoIP with dynamic scheduling monitors layer 1 CCEs (Control Channel Elements) continuously for dynamic scheduling grants even though the mobile device might be only involved in a VoIP session. LTE (Long Term Evolution) refers to CCEs, but the term has more general application to mean simply control information.

As indicated above, a mobile device may support VoIP with dynamic scheduling by monitoring layer 1 CCEs continuously for dynamic scheduling grants. Unfortunately, this might waste battery power for the mobile device, particularly when there are very few or even no dynamic scheduling grants for the mobile device.

Referring now to FIG. 1, shown is a signalling diagram showing dynamic scheduling vs. semi-persistent scheduling. Time is on the horizontal axis. Shown is a periodic semi-persistent allocation 50. For VoIP transmission, this can for example include a resource allocated every 20 ms. In addition, there is a regular set of layer 1 CCEs 52 that are transmitted. In the illustrated example, these are transmitted in every 1 ms but it is to be clearly understood that the other resource allocation periods and CCE periods are possible. This example assumes downlink transmission, but a similar approach applies to uplink transmission. During the periods that occur between talk-spurts, (also referred to as "silence" or "silence periods"), the transmitter and receiver can be turned off. During a talk-spurt period (also referred to as a period that VoIP transmission is "active", or "active mode"), if not for dynamic scheduling, the mobile device could wake up regularly to blind-detect its data in the semi-persistently allocated resource at the pre-defined interval (e.g. every 20 ms) while entering a "sleeping" mode at other times. This can also be referred to as DRX (discontinuous reception). This simply means that the receive capability of the mobile device's radio is basically turned off while the mobile device is in sleep mode thereby resulting in battery life extension.

However, given that other data may arrive via dynamic scheduling by any of the CCEs 52, the mobile device needs to monitor the CCEs of all sub-frames. In the full dynamic scheduling case there is no discontinuous transmission (DTX) or DRX and this rules out the possibility of using DRX since the mobile device needs to continue monitoring the layer 1 CCEs for dynamic scheduling grants. This is not power efficient and leads to lower battery charge lifetimes.

To efficiently support the DRX in VoIP active mode in order to reduce the battery power consumption, systems and methods are provided for combining semi-persistent scheduling for VoIP with a scheduling capability for additional packet transmission.

System for Semi-Persistent Scheduling and DRX Control

Figure 2:
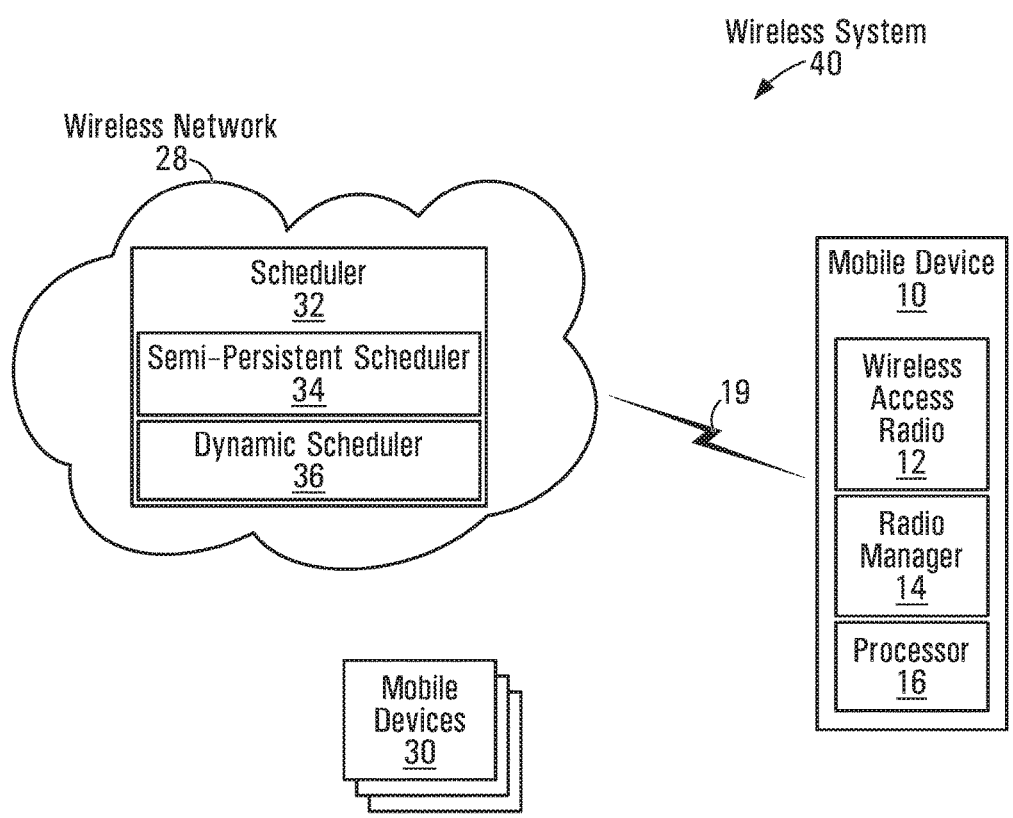
FIG. 2 is a block diagram of an example wireless system.

Referring now to FIG. 2, shown is a block diagram of an example wireless system 40. The wireless system 40 has a wireless network 28 and a mobile device 10. The wireless system also has other mobile devices 30.

The mobile device 10 has a wireless access radio 12, a processor 16 and a radio manager 14 that is responsible for controlling the wireless access radio 12. There may be additional components not shown. The wireless network 28 has a scheduler 32 that encompasses a semi-persistent scheduler 34 and a dynamic scheduler 36. The wireless network 28 has components such as base stations (not shown) for providing wireless access. The scheduler 32 may reside in the base stations or elsewhere in the network 28. In LTE, the scheduler is typically in the eNB (enhanced NodeB). In the examples that follow, it is assumed scheduler 32 is part of a base station.

In the illustrated example, the scheduler 32 and radio manager 14 are implemented as software and executed on processors forming part of the network 28 and mobile device 10 respectively. However, more generally, these functions may be implemented as software, hardware, firmware, or any appropriate combination thereof.

Furthermore, it is to be understood that the wireless network would have any appropriate components suitable for a wireless network 28. Note that the wireless network may include wires that interconnect network components in addition to components for providing wireless communication with mobile devices. The components of the wireless network are implementation specific and may depend on the type of wireless network. There are many possibilities for the wireless network. The wireless network might for example be a UMTS network or any cellular network that uses semi-persistent resource assignment.

In operation, the mobile device 10 communicates with the wireless network 28 over a wireless connection 19 between the mobile device 10 and the wireless network 28. The communication with the wireless network 28 includes VoIP packet transmission and additional packet transmission. The semi-persistent scheduler 34 is responsible for making an initial resource allocation for a VoIP service to the mobile device 10. This includes an uplink semi-persistent allocation and a downlink semi-persistent allocation. The semi-persistent scheduler 34 is also responsible for keeping track of whether there is a talk-spurt in progress for the uplink and/or the downlink and for turning on and off the uplink and/or downlink allocation accordingly. While de-allocated, the semi-persistently allocated resources can be made available for other purposes. Note that the form of the transmission resources that are being allocated is implementation specific. Particular examples of resources that might be used include OFDM resources and CDMA resources. The dynamic scheduler 36 is responsible for making resource allocations for additional packet transmissions that are not accommodated by the semi-persistent allocation. The additional packets may be related to and/or form part of the VoIP service, or be unrelated to the VoIP service.

The radio manager 14 controls the on/off state of the wireless access radio 12. In some wireless access radios, the transmitter and receiver must be turned on and off together, and as such, uplink and downlink scheduling must be coordinated to allow the wireless access radio to be turned off. In some wireless access radios, receive and transmit capabilities can be independently turned off.

In some embodiments, the network 28 sends DRX control signalling to the mobile device 10 that sets a repeating pattern that has a DRX period having an awake period and a sleep period. An example could be: DRX period is 20 ms with sleep period equal to 15 ms and awake period equal to 5 ms. During the awake period, the mobile device turns its receiver on. During the sleep period, the mobile device turns its receiver off. This signalling might be sent at the start of each VoIP session, for example.

Figure 3:
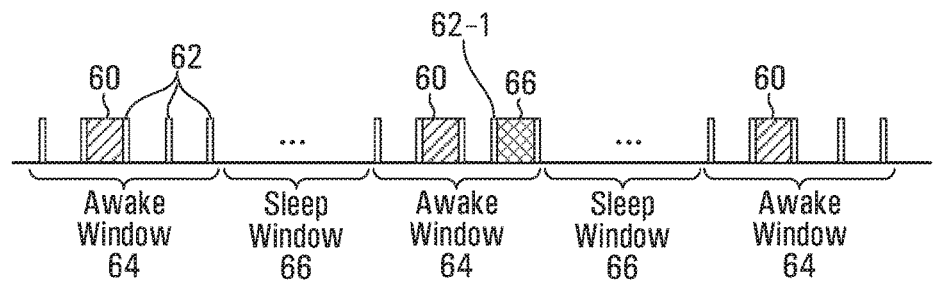
FIG. 3 is a signalling diagram showing an awake period for dynamic scheduling in DRX (discontinuous reception)

Referring now to FIG. 3, shown is a signalling diagram showing an example of semi-persistent and dynamic scheduling and DRX. Shown is a semi-persistent allocation 60 available for semi-persistent VoIP DL transmissions. In addition, there are layer 1 CCEs 62 for signalling dynamic allocations so as to allow the transmission of additional packets. This represents the transmissions from the base station. The mobile device receiving the transmissions alternates between being in an awake state and a sleep state. The mobile station is in an awake state during awake periods 64 and the mobile device is nominally in a sleep state during sleep periods 66. The first thing that the scheduler in the network needs to do is to ensure that the semi-persistent allocation 60 coincides with the awake periods 64. In addition, each awake period 64 is longer than the minimum necessary to transmit the VoIP semi-persistent allocation. There is also the opportunity to dynamically schedule (as signalled on one of the CCEs 62) and transmit an additional packet. An example of this is shown where a dynamic allocation is signalled in CCE 62-1. Additional packet is shown transmitted immediately following CCE 62-1. The additional packet might for example be an RTCP (radio transmission control protocol) packet, SIP/SDP (session initiation protocol, session description protocol) packet, or a packet that has not undergone IP\UDP\RTP (internet protocol\user datagram protocol\radio transmission protocol) header compression, etc. While the mobile device is in the sleep state, it operates in a reduced power consumption mode, by turning off reception capability and/or by turning off its reception and transmission capabilities. In this example, the network has scheduled the additional packet 67 to be transmitted during one of the awake periods 64, and signals this using a CCE 62-1 that is transmitted during one of the awake periods 64. More generally, when the mobile device wakes up after a sleep period, the mobile device will not only blind detect its own VoIP data on the semi-persistently allocated resource 60, but also will detect, more generally attempt to detect, all the CCEs during the awake periods.

In some embodiments, after the mobile device determines that there will be a dynamically allocated resource for the mobile device as signalled in one of the CCEs in a given awake period, the mobile device does not monitor further CCEs during that awake period.

In some embodiments, the base station will transmit signalling to configure the mobile device with this DRX behaviour, and thereafter all the dynamic scheduling will occur only in this "awake period". For example, the mobile device may sleep every 15 ms, and then wake up for 5 ms to continuously receive data. The behaviour repeats with a period of 20 ms. During the 5 ms awake period, the mobile device will blind-detect its VoIP data on the semi-persistently allocated resource and also the mobile device will monitor all the CCEs. The base station understands this DRX configuration and will schedule the associated dynamic packets such as RTCP, SIP/SDP, etc, during this 5 ms awake period. In some implementations, when a retransmission occurs, the mobile device will be in continuous mode by default.

The radio manager 14 controls the operation of the wireless access radio 12 such that a reception capability is powered on during the awake periods, and off for at least some of the sleep periods. As described below, it may be necessary for the reception capability to be on during some of the sleep periods to allow for retransmissions.

The signalling for dynamic scheduling is performed during the awake periods. In addition, the actual resources allocated for the additional packet transmissions are scheduled to occur during the awake periods.

In some embodiments, when it becomes necessary for a retransmission, the mobile device enters a continuous mode of operation. While in continuous mode, the mobile device continuously receives and monitors the downlink channel and does not turn off reception capability. Further, in some embodiments, if a mixed service needs to be provided to the mobile device, this is used as a trigger to also enable the continuous mode operation. This trigger may be dependent on the traffic QoS of the service being added.

Uplink Semi-Persistent Alignment with Downlink for DRX

Figure 4:
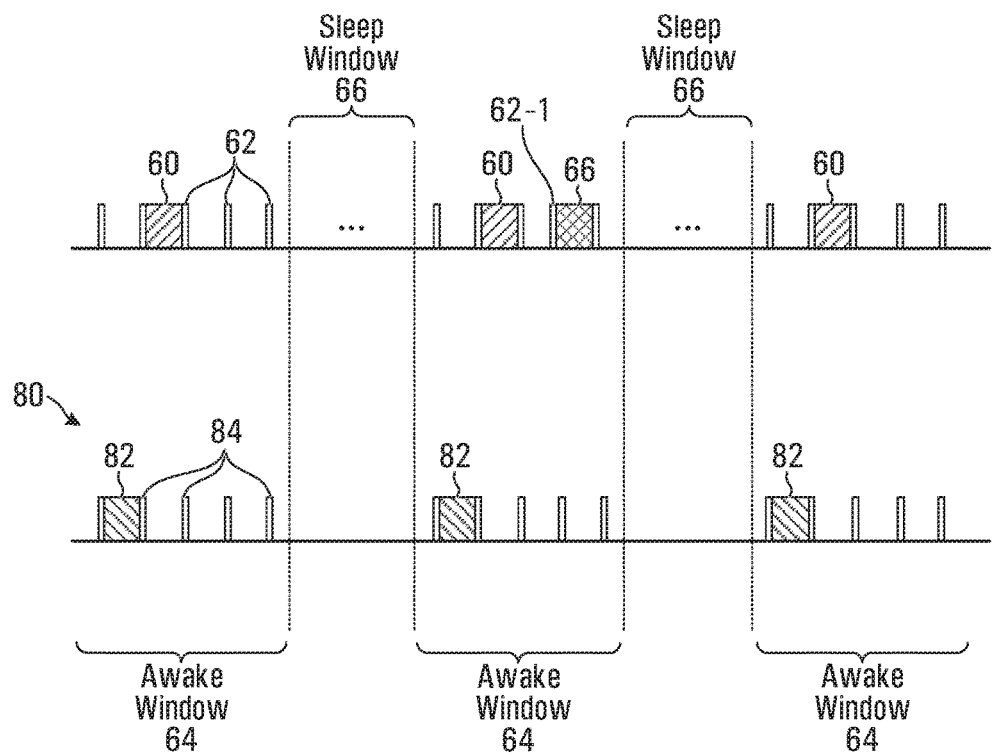
FIG. 4 is a signalling diagram showing DRX and DTX (discontinuous transmission) for uplink and downlink.

The above discussion is focussed on downlink transmission from the base station to the mobile device and on the mobile device's ability to turn off its reception capability during the sleep period. However, some mobile devices are not able to turn off only their reception capability while leaving on a transmit capability or vice versa. Thus, for such devices in order to fully realize the benefit of having an awake period and a sleep period for reception, uplink transmissions should are also scheduled to align with these awake periods and sleep periods. An example of this is shown in FIG. 4. In FIG. 4, the downlink transmission is indicated at 78 and this is basically the same as that described above with reference to FIG. 3, and this will not be described again. The uplink transmissions are generally indicated at 80. Here, there is a semi-persistent allocation 82 for VoIP UL transmissions. These are scheduled to occur during the periods 64 that the mobile device is awake. In addition, an uplink control channel is indicated at 84. In the illustrated example, this occurs every 1 ms. The mobile device only transmits the uplink control channel during the awake periods 64. The mobile device can use the uplink control channel to make requests for additional resources. By scheduling the uplink semi-persistent transmission and downlink semi-persistent transmission to occur during the same awake period, the mobile device can realize much more efficient DRX and DTX (discontinuous reception and discontinuous transmission) behaviour. In the example of FIG. 4, the mobile device is configured to sleep every 15 ms, and then wake up for 5 ms. During this 5 ms awake period, the mobile device will receive DL semi-persistent reception if available (during a DL talk-spurt) and make an uplink semi-persistent transmission if available (during an UL talk-spurt). The mobile device will also detect all the DL grants and possibly make uplink additional resource requests.

In case of retransmissions (either the DL or the UL), the mobile device will enter the continuous mode by default. Note that both the uplink and downlink VoIP semi-persistent allocations have the same traffic characteristics (every 20 ms), hence the base station can easily align the semi-persistent allocation for the DL and UL.

With this approach, even in the active mode (talk-spurt in progress on the uplink or the downlink), the mobile device can be in DRX and DTX mode most of the time. The mobile device monitors the Layer 1 CCEs on the downlink only during the awake period, and may request more resources on the uplink. This can save battery power for the mobile device. Considering that an additional IP packet delivery during a VoIP session may be infrequent, the battery saving could be significant. A drawback is that the dynamic scheduling could be delayed by an additional 10 ms on average.

Figure 5:
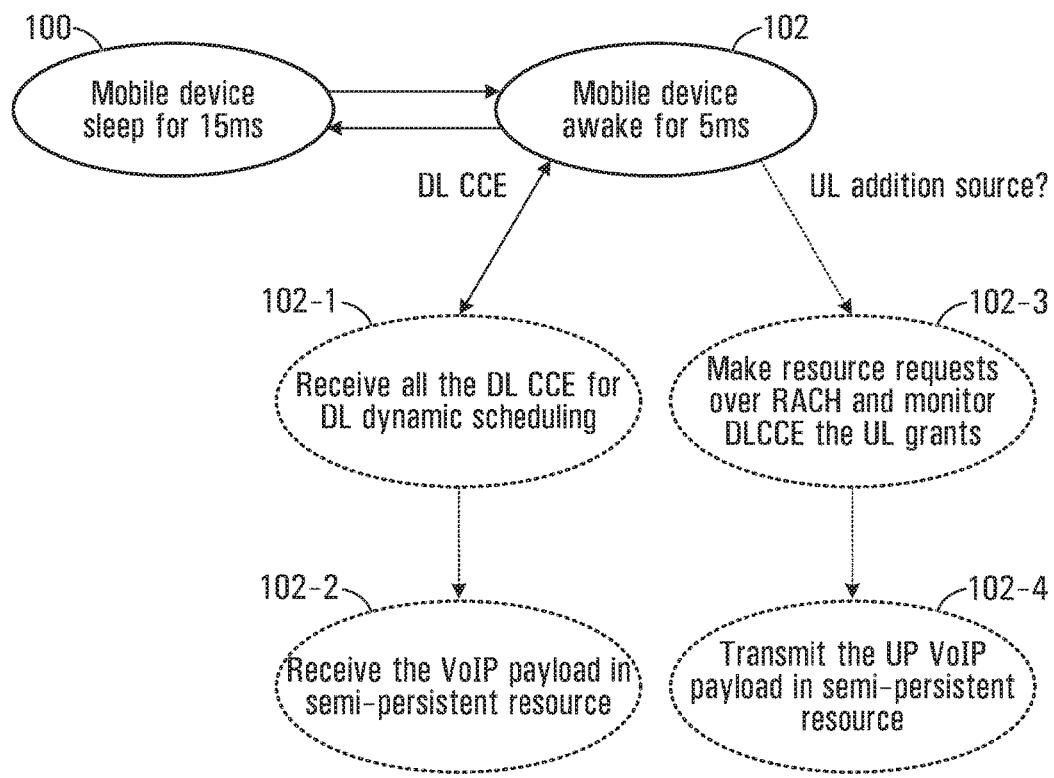
FIG. 5 is a state diagram having DRX and DTX transitions for VoIP.

Referring now to FIG. 5, shown is a state diagram having DRX/DTX state transitions for VoIP. It is noted that when there is no uplink and downlink transmission (i.e. silence in both directions), the mobile device only needs to monitor the DL CCEs for dynamic scheduling during the awake period. There are two main states. The first main state is the UE sleep state 100 and the second main state is the UE awake state 102. For the illustrated example, it is assumed that the sleep state 100 lasts 15 ms and the awake state lasts 5 ms and can be extended, but this is again implementation specific. Steps 102-1 and 102-2 are executed for downlink communication during the awake state 102. Step 102-1 involves receiving all of the downlink CCEs and processing them to identify downlink dynamic scheduling if present. This is done irrespective of whether or not there is any downlink VoIP transmission. In the event that a downlink talk-spurt is ongoing, then step 102-2 is also executed. This involves receiving the VoIP payload in the semi-persistent resource. Steps 102-3 and 102-4 are executed in respect of uplink transmissions. 102-3 is only executed if the mobile device determines that it needs a dynamic allocation for uplink transmission. Step 102-3 involves making a resource request, for example over a random access channel, and monitoring the downlink CCE for uplink grants. In addition, if there is an uplink talk-spurt in progress, then the mobile device will execute step 102-4 which involves transmitting the uplink VoIP payload in the semi-persistent resource for uplink transmission.

The above description has focussed on applications where the traffic that is sent using the semi-persistent allocation is VoIP traffic. More generally, the same methods and systems can be applied to combine the transmission and scheduling of traffic of any type on a semi-persistently allocated resource with the transmission and scheduling of traffic that uses dynamic resource allocations.

In the above examples, CCEs spaced by 1 ms are used for the downlink control channel. More generally, the downlink control channel can take any form. The only limitation is that dynamic allocations for a given mobile device take place during awake periods for the mobile device. Similarly, at least in the figures, the uplink control channel has been depicted as a random access channel that is available at intervals spaced by 1 ms. More generally, the uplink control channel for requesting additional resource allocations can come in any form. The only limitation is that requests for dynamic allocations for uplink transmission from a given mobile device will need to be transmitted during awake periods for the mobile device.

In some embodiments, the additional packet is transmitted as a series of one or more sub-packets formed by segmenting the additional packet. These are subject to reassembly at the receiver.

Figure 6:
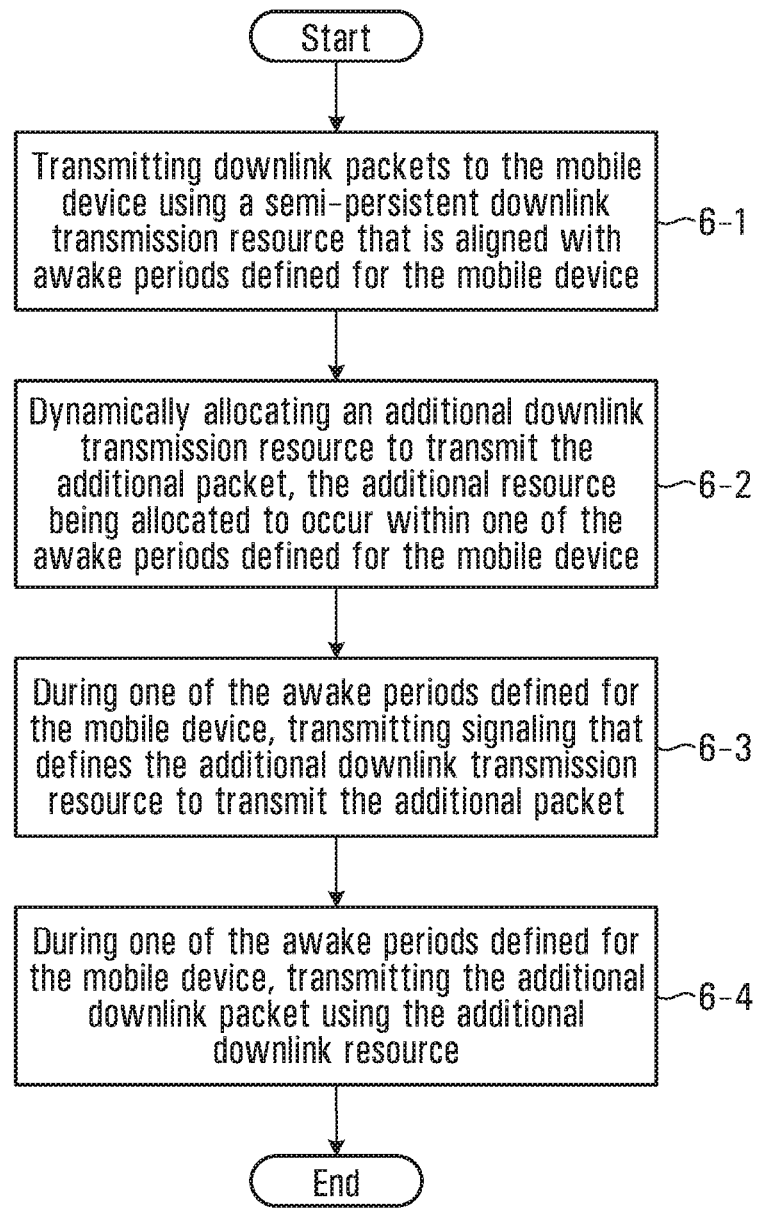
FIGS. 6 and 7 are flowcharts of methods executed by a network to perform combined semi-persistent and dynamic scheduling.

Methods for Semi-Persistent Scheduling and DRX Control Executed by the Wireless Network A method in a wireless network for performing downlink transmission to mobile devices will be described with reference to the flowchart of FIG. 6. These steps are performed for each mobile device being provided wireless access on a semi-persistent downlink transmission resource. The method begins at step 6-1 with transmitting downlink packets to the mobile device using a semi-persistent downlink transmission resource that is aligned with awake periods defined for the mobile device. These can be downlink VoIP packets during a downlink talk-spurt for a VoIP session involving the mobile device or otherwise. Steps 6-2, 6-3, 6-4 are executed for each additional downlink packet for the mobile device. In step 6-2, the wireless network dynamically allocates an additional downlink transmission resource to transmit the additional packet, the additional resource being allocated to occur within one of the awake periods defined for the mobile device. In step 6-3, during one of the awake periods defined for the mobile device, the wireless network transmits signaling that defines the additional downlink transmission resource to transmit the additional packet. In step 6-4, during one of the awake periods defined for the mobile device, the wireless network transmits the additional downlink packet using the additional downlink resource. In some embodiments, all of the steps are performed in a base station. In other embodiments, certain steps, for example the dynamic allocation, can be performed in another network element if centralized scheduling is performed.

Figure 7:
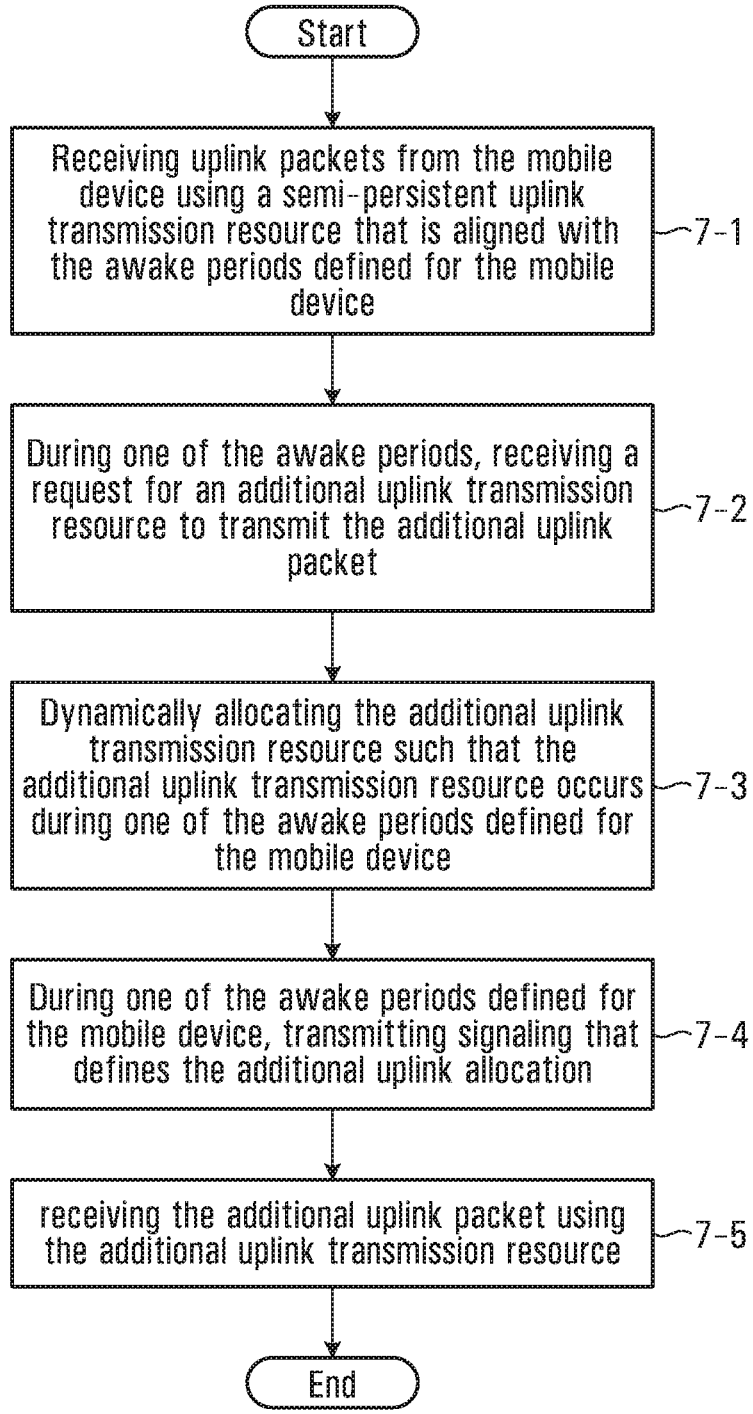

A method in a wireless network for performing uplink reception from mobile devices will be described with reference to the flowchart of FIG. 7. These steps are performed for each mobile device being provided wireless access on a semi-persistent downlink transmission resource. The method begins with receiving uplink packets from the mobile device using a semi-persistent uplink transmission resource that is aligned with the awake periods defined for the mobile device. These can be VoIP packets during an uplink talk-spurt for a VoIP session involving the mobile device or otherwise. Steps 7-2, 7-3, 7-4 and 7-5 are performed for each additional each additional uplink packet for the mobile device. In step 7-2, during one of the awake periods, the wireless network receives a request for an additional uplink transmission resource to transmit the additional uplink packet. In step 7-3, the wireless network dynamically allocates the additional uplink transmission resource such that the additional uplink transmission resource occurs during one of the awake periods defined for the mobile device. In step 7-4, during one of the awake periods defined for the mobile device, the wireless network transmits signaling that defines the additional uplink allocation. In step 7-5, the wireless network receives the additional uplink packet using the additional uplink transmission resource.

Figure 8:
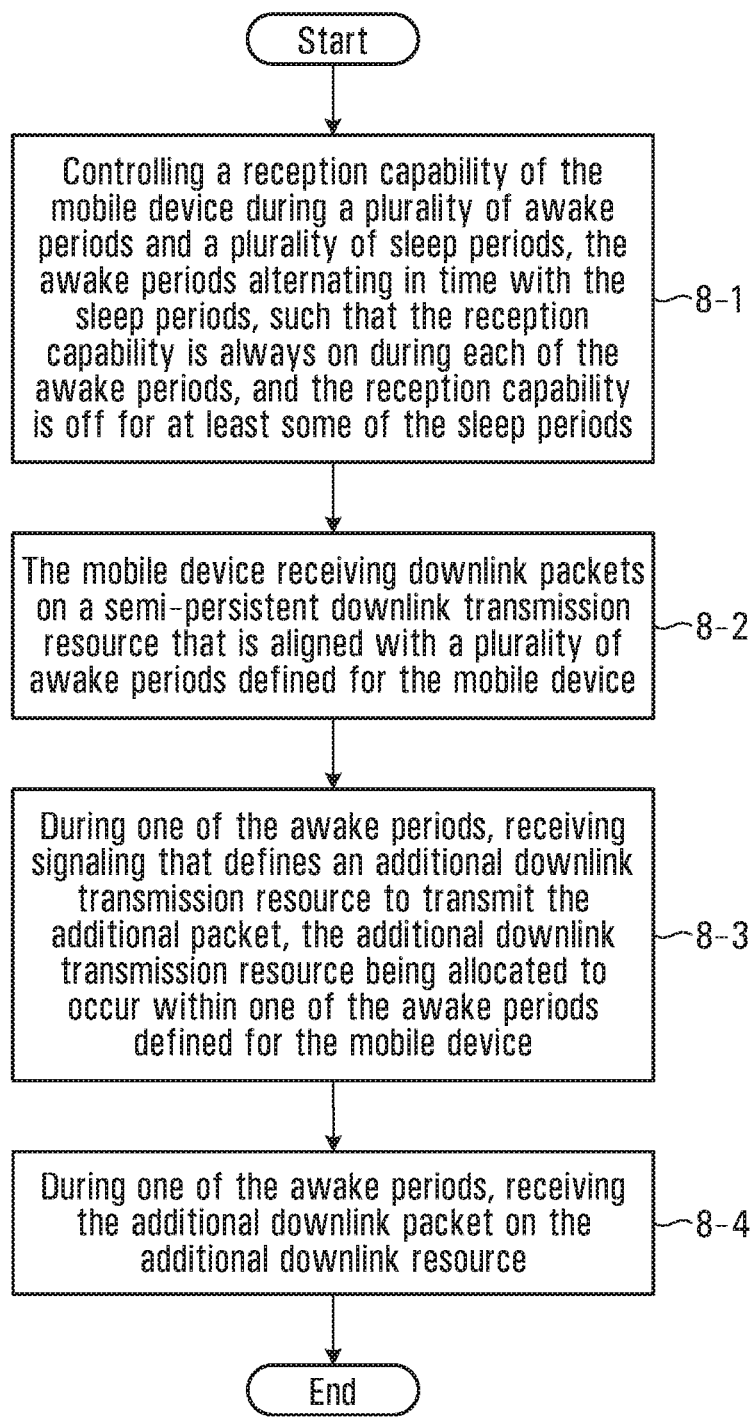
FIGS. 8 and 9 are flowcharts of methods executed by a mobile device to perform combined semi-persistent and dynamic scheduling.

In some embodiments, the wireless network transmits signaling to each mobile device that defines the awake periods and that defines sleep periods of that mobile device and/or that defines the semi-persistent uplink and/or downlink transmission resource of that mobile device. For VoIP, the signaling to define the semi-persistent resources might be done at the start of each VoIP session. Such signaling can be performed on a channel that is dedicated to each mobile device, or using a broadcast channel containing such signaling for multiple devices.

Methods for Semi-Persistent Scheduling and DRX Control Executed by the Mobile Device Referring now to FIG. 8, a method of receiving downlink transmission executed by a mobile device will now be described. The method begins at step 8-1 with the mobile device controlling a reception capability of the mobile device during a plurality of awake periods and a plurality of sleep periods, the awake periods alternating in time with the sleep periods, such that the reception capability is always on during each of the awake periods, and the reception capability is off for at least some of the sleep periods. On a nominal basis, typically the reception capability will be off for every sleep period. At step 8-2, the mobile device receives downlink packets on a semi-persistent downlink transmission resource that is aligned with a plurality of awake periods defined for the mobile device. These can be VoIP downlink packets during a downlink talk-spurt for a VoIP session involving the mobile device, or otherwise. Steps 8-3 and 8-4 are performed for each additional downlink packet for the mobile device. In step 8-3, during one of the awake periods, the mobile device receives signaling that defines an additional downlink transmission resource to transmit the additional packet, the additional downlink transmission resource being allocated to occur within one of the awake periods defined for the mobile device. In step 8-4, during one of the awake periods, the mobile device receives the additional downlink packet on the additional downlink resource.

The mobile device may receive signaling that defines the awake periods and the sleep periods of the mobile device and/or that defines the semi-persistent downlink transmission resource of that mobile device. This may take place over a respective dedicated channel for the mobile device or over a broadcast channel containing signaling information for the mobile device and other mobile devices.

Figure 9:
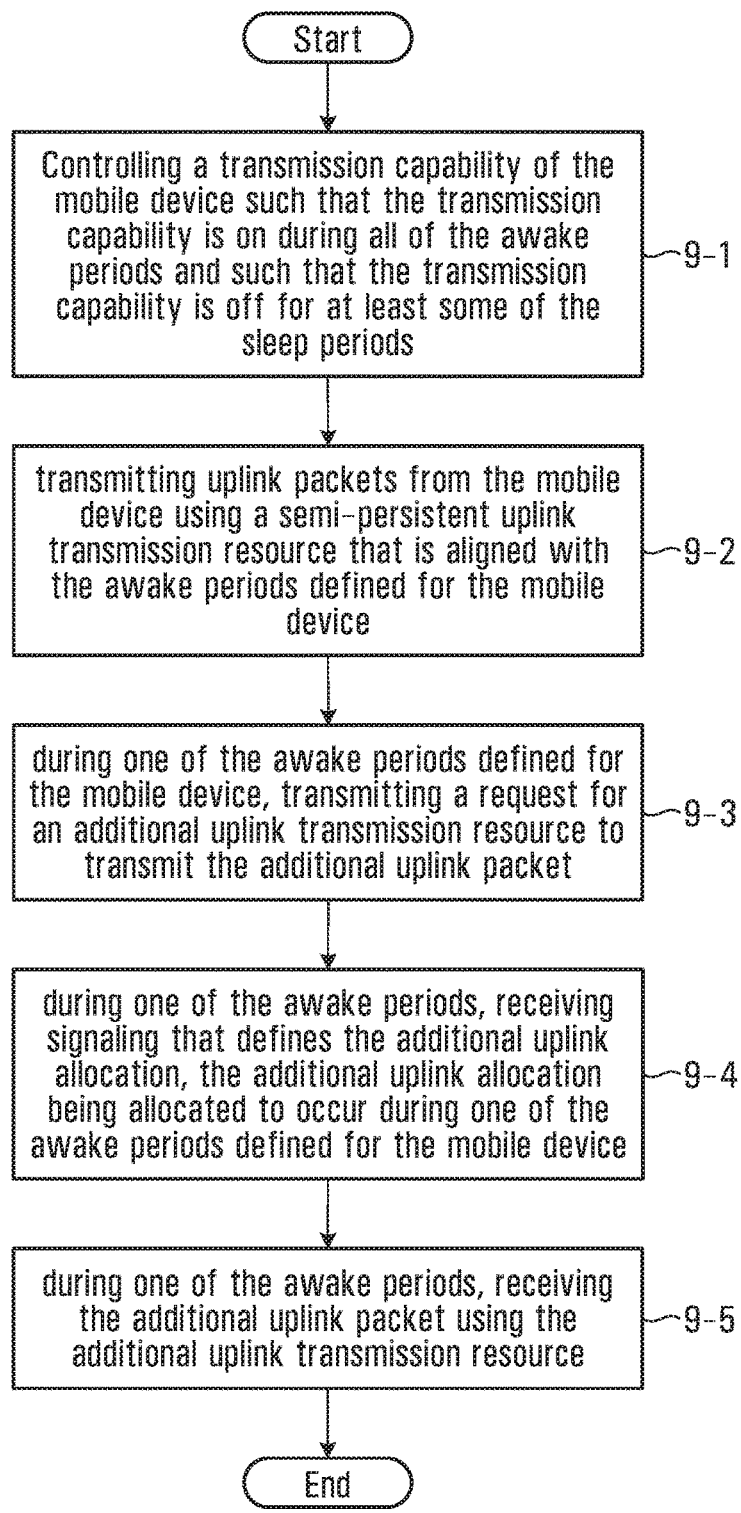

Referring now to FIG. 9, a method of transmitting uplink transmissions executed by a mobile device will now be described. The method begins at step 9-1 with controlling a transmission capability of the mobile device such that the transmission capability is on during all of the awake periods and such that the transmission capability is off for at least some of the sleep periods. In step 9-2, the mobile device transmits uplink packets (VoIP packets or otherwise) using a semi-persistent uplink transmission resource that is aligned with the awake periods defined for the mobile device. Steps 9-3, 9-4, 9-5 are executed for each additional uplink packet for the mobile device. In step 9-3, during one of the awake periods defined for the mobile device, the mobile device transmits a request for an additional uplink transmission resource to transmit the additional uplink packet. In step 9-4, during one of the awake periods, the mobile device receives signaling that defines the additional uplink transmission resource, the additional uplink transmission resource being allocated to occur during one of the awake periods defined for the mobile device. In step 9-5, during one of the awake periods, the mobile device transmits the additional uplink packet using the additional uplink transmission resource.

The mobile device may receive signaling that defines the semi-persistent uplink resource. In some embodiments, the request for an additional uplink allocation is transmitted using a contention based random access channel.

In some embodiments, mobile devices have radios that feature a transmitter and a receiver. While the radio is on, the receiver capability is on, and the receiver will be actively attempting to process signals received on the mobile device's antenna(s). There is not necessarily content for the given mobile device all the time that the receiver is on, but the receiver is consuming power nonetheless for that time period. In addition, while the radio is on, the mobile device is able to transmit. However, so long as the mobile device does not have something to transmit, there is no active transmission taking place, and as such little or no transmit power consumption occurs until there is an active transmission.

In embodiments referring to NACK/ACK transmission, the particular NACK/ACK scheme employed is implementation specific. Some embodiments employ an ACK only scheme; other embodiments employ a NACK only scheme, while others use both ACKs and NACKs.

Another Mobile Device

Figure 10:
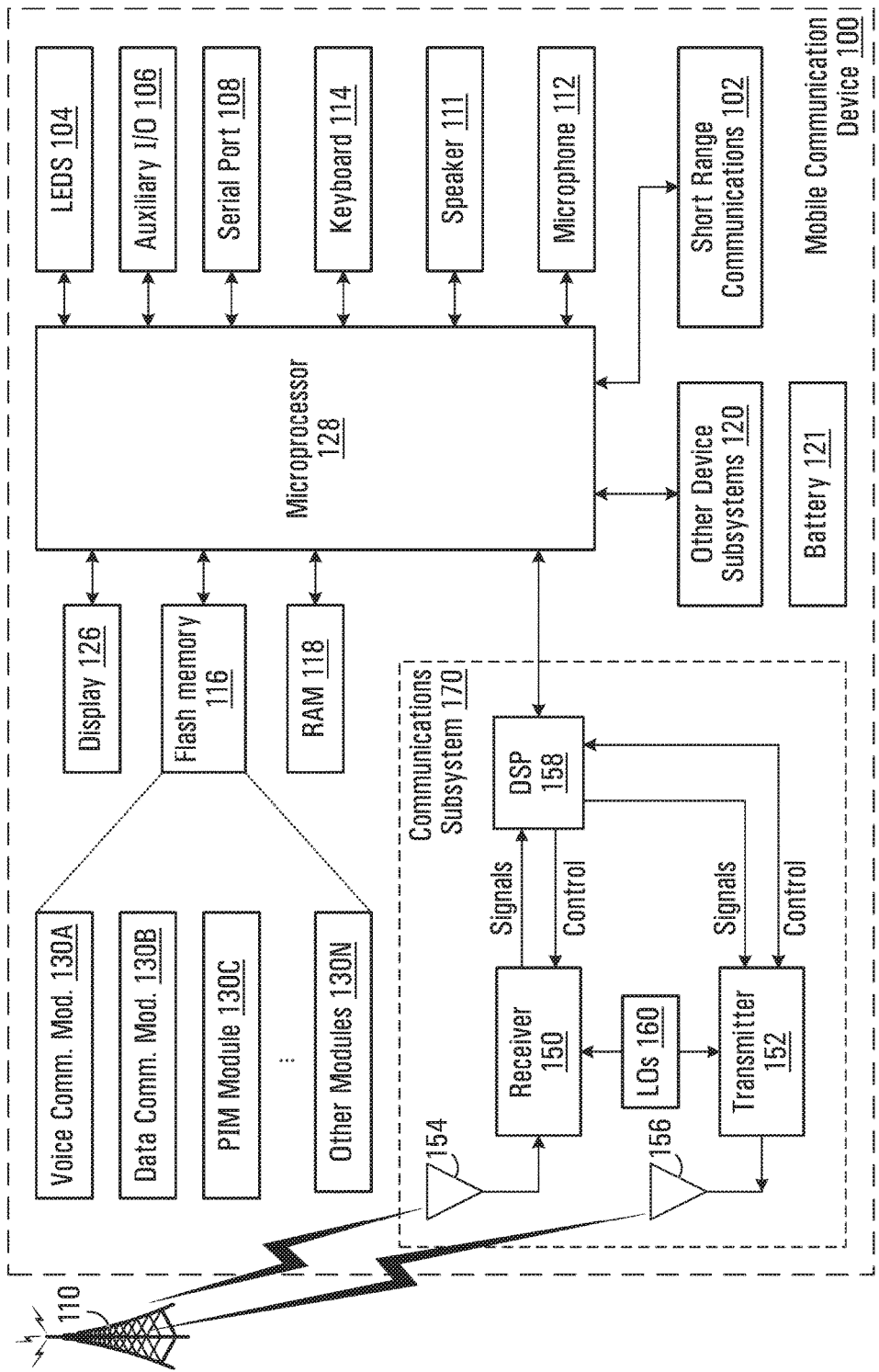
FIG. 10 is a block diagram of a mobile device.

Referring now to FIG. 10, shown is a block diagram of another mobile device that may implement any of the mobile device methods described herein. The mobile device 101 is shown with specific components for implementing features similar to those of the mobile device 10 of FIG. 2. It is to be understood that the mobile device 101 is shown with very specific details for example purposes only.

A processing device (a microprocessor 128) is shown schematically as coupled between a keyboard 114 and a display 126. The microprocessor 128 may be a specific example of the processor with features similar to those of the processor 16 of the mobile device 10 shown in FIG. 2. The microprocessor 128 controls operation of the display 126, as well as overall operation of the mobile device 101, in response to actuation of keys on the keyboard 114 by a user.

The mobile device 101 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 101 are shown schematically. These include: a communications subsystem 170; a short-range communications subsystem 103; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 101 may have a battery 121 to power the active elements of the mobile device 101. The mobile device 101 is in some embodiments a two-way radio frequency (RF) communication device having voice and data communication capabilities. In addition, the mobile device 101 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 101 may also be stored to the RAM 118.

The microprocessor 128, in addition to its operating system functions, enables execution of software applications on the mobile device 101. A predetermined set of software applications that control basic device operations, such as a voice communications module 130A and a data communications module 130B, may be installed on the mobile device 101 during manufacture. In addition, a personal information manager (PIM) application module 130C may also be installed on the mobile device 101 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture. One or more of the modules 130A, 130B, 130C, 130N of the flash memory 116 can be configured for implementing features similar to those of the radio manager 14 of the mobile device 10 shown in FIG. 2.

Communication functions, including data and voice communications, are performed through the communication subsystem 170, and possibly through the short-range communications subsystem 103. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a specific example of the wireless access radio of the mobile device 10 shown in FIG. 2. The specific design and implementation of the communication subsystem 170 is dependent upon the communication network in which the mobile device 101 is intended to operate. For example, the communication subsystem 170 of the mobile device 101 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. The communication subsystem 170 may also be designed to operate with an 802.11 Wi-Fi network, and/or an 802.16 WiMAX network. Other types of data and voice networks, both separate and integrated, may also be utilized with the mobile device 101.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 101 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 101. In addition, the display 126 may also be utilized in voice communication mode, for example, to display the identity of a calling party, the duration of a voice call, or other voice call related information.

The short-range communications subsystem 103 enables communication between the mobile device 101 and other proximate systems or devices, which need not necessarily be similar devices. For example, the short-range communications subsystem may include an infrared device and associated circuits and components, or a Bluetooth™ communication module to provide for communication with similarly-enabled systems and devices.

Numerous modifications and variations of the present application are possible in light of the above teachings. It is therefore to be understood that within the scope of the appended claims, the application may be practised otherwise than as specifically described herein.

The invention claimed is:

1. A method in a wireless network, the method comprising:
   for each mobile device of a plurality of mobile devices, in order to receive from the mobile device, the wireless network:
   a) receiving uplink packets from the mobile device using a periodic semi-persistent uplink transmission resource that is aligned with awake periods defined for the mobile device by the network during establishment of discontinuous reception (DRX) mode;
   b) for each additional uplink packet or sub-packet for the mobile device:

i) during one of the awake periods, receiving a request for an additional uplink transmission resource to transmit the additional uplink packet or sub-packet;
ii) dynamically allocating the additional uplink transmission resource such that the additional uplink transmission resource occurs during one of the awake periods defined for the mobile device;
iii) during one of the awake periods defined for the mobile device, transmitting signaling that defines the additional uplink allocation;
iv) receiving the additional uplink packet or sub-packet using the additional uplink transmission resource.

2. The method of claim 1 wherein receiving uplink packets from the mobile device using a semi-persistent uplink transmission resource that is aligned with the awake periods defined for the mobile device comprises receiving uplink VoIP packets during an uplink talk-spurt for a VoIP (voice over IP (Internet Protocol)) session involving the mobile device.

3. The method of claim 1 further comprising:
for each mobile device, transmitting signaling to the mobile device that defines the semi-persistent uplink resource for the mobile device.

4. The method of claim 1 further comprising:
for each mobile device of the plurality of mobile devices, in order to transmit to the mobile device the wireless network:
c) transmitting downlink packets to the mobile device using a periodic semi-persistent downlink transmission resource that is aligned with the awake periods defined for the mobile device by the network during establishment of the DRX mode;
d) for each additional downlink packet or sub-packet for the mobile device:
i) dynamically allocating an additional downlink transmission resource to transmit the additional packet or sub-packet, the additional resource being allocated to occur within one of the awake periods defined for the mobile device;
ii) during one of the awake periods defined for the mobile device, transmitting signaling that defines the additional downlink transmission resource to transmit the additional packet or sub-packet;
iii) during one of the awake periods defined for the mobile device, transmitting the additional downlink packet using the additional downlink resource;
wherein:
transmitting downlink packets to the mobile device using a semi-persistent downlink transmission resource that is aligned with awake periods defined for the mobile device comprises transmitting downlink VoIP packets during a downlink talk-spurt for a VoIP session involving the mobile device.

5. The method of claim 1 further comprising:
transmitting signaling to each mobile device that defines the awake periods and that defines sleep periods of that mobile device.

6. The method of claim 1 further comprising:
transmitting signaling to each mobile device that defines the semi-persistent downlink transmission resource of that mobile device.

7. The method of claim 1 further comprising:
transmitting a control channel containing signaling information;
wherein for each mobile device, transmitting signaling during one of the awake periods defined for the mobile device that defines the uplink resource for the additional uplink packet comprises transmitting the signaling information on the control channel during one of the awake periods defined for that mobile device.

8. A method in a mobile device, the method comprising:
controlling a transmission capability of the mobile device during a plurality of awake periods and a plurality of sleep periods, the awake periods alternating in time with the sleep periods, such that the transmission capability is on during all of the awake periods and such that the transmission capability is off for at least some of the sleep periods;
transmitting uplink packets from the mobile device using a periodic semi-persistent uplink transmission resource that is aligned with the awake periods defined for the mobile device by a network during establishment of discontinuous reception (DRX) mode;
for each additional uplink packet or sub-packet for the mobile device:
i) during one of the awake periods defined for the mobile device, transmitting a request for an additional uplink transmission resource to transmit the additional uplink packet or sub-packet;
ii) during one of the awake periods, receiving signaling that defines the additional uplink allocation, the additional uplink allocation being allocated to occur during one of the awake periods defined for the mobile device;
iii) during one of the awake periods, transmitting the additional uplink packet or sub-packet using the additional uplink transmission resource.

9. The method of claim 8 wherein:
transmitting uplink packets from the mobile device using a semi-persistent uplink transmission resource that is aligned with the awake periods defined for the mobile device comprises transmitting VoIP uplink packets during an uplink talk spurt for a VoIP session involving the mobile device.

10. The method of claim 9 further comprising:
receiving signaling that defines the semi-persistent uplink transmission resource.

11. The method of claim 9 wherein for each additional uplink packet or sub-packet transmitting a request for an additional uplink transmission resource comprises transmitting the request using a contention based random access channel.

12. The method of claim 8 further comprising:
controlling a reception capability of the mobile device such that the reception capability is always on during each of the awake periods, and the reception capability is off for at least some of the sleep periods;
receiving at the mobile device downlink packets on a semi-persistent downlink transmission resource that is aligned with the plurality of awake periods defined for the mobile device;
for each additional downlink packet or sub-packet for the mobile device:
i) during one of the awake periods, receiving signaling that defines an additional downlink transmission resource to transmit the additional downlink packet or sub-packet;
ii) during one of the awake periods, receiving the additional downlink packet or sub-packet on the additional downlink resource;
wherein receiving downlink packets on a semi-persistent downlink transmission resource comprises receiving VoIP downlink packets during a downlink talk-spurt for a VoIP session involving the mobile device.

13. The method of claim 12 wherein controlling a reception capability of the mobile device during a plurality of awake periods and a plurality of sleep periods, the awake periods alternating in time with the sleep periods, such that the reception capability is always on during each of the awake periods, and the reception capability is off for at least some of the sleep periods comprises:

turning off reception capability during each of the plurality of sleep periods, unless a retransmission is expected.

14. The method of claim 8 further comprising:

receiving signaling that defines the awake periods and the sleep periods of the mobile device.

15. The method of claim 12 further comprising:

receiving signaling that defines the semi-persistent downlink transmission resource of that mobile device.

16. The method of claim 8 further comprising:

receiving a control channel containing signaling information for the mobile device and other mobile devices;

wherein receiving signaling during one of the awake periods that defines the uplink resource for the additional uplink packet or sub-packet comprises receiving the signaling information on the control channel during one of the awake periods for that mobile device.

17. The method of claim 16 further comprising:

during every awake period, monitoring the control channel for signaling information indicating a dynamic allocation of a uplink resource for an additional downlink packet or sub-packet.

18. A wireless network comprising:

a semi-persistent scheduler configured to allocate a periodic semi-persistent uplink transmission resource that is aligned with awake periods defined for a mobile device by the network during establishment of discontinuous reception (DRX) mode for receiving transmissions from the mobile device;

a processor configured to:
  a) control a receiver to receive uplink packets from the mobile device using the semi-persistent uplink transmission resource allocated by the semi-persistent scheduler;
  b) for each additional uplink packet or sub-packet from the mobile device:
    i) during one of the awake periods defined for the mobile device, control the receiver to receive a request for an additional uplink transmission resource;
    ii) during one of the awake periods defined for the mobile device, control a transmitter to transmit signaling that defines the additional uplink resource allocation;
    iii) control the receiver to receive the additional uplink packet or sub-packet using the additional uplink transmission resource; and
a dynamic scheduler configured to dynamically allocate the respective additional uplink transmission resource to transmit each additional packet or sub-packet, the additional resource being allocated to occur during one of the awake periods defined for the mobile device.

19. A mobile device comprising:

a wireless access radio;

a radio manager configured to control a transmission capability of the wireless access radio during a plurality of awake periods and a plurality of sleep periods, the awake periods alternating in time with the sleep periods, such that the transmission capability is always on during each of the awake periods, and the transmission capability is off for at least some of the sleep periods;

the mobile device being configured to:

transmit uplink packets on a periodic semi-persistent uplink transmission resource that is aligned with the plurality of awake periods defined for the mobile device by a network during establishment of discontinuous reception (DRX) mode;

for each additional uplink packet or sub-packet for the mobile device:
  i) during one of the awake periods, transmit a request for an additional uplink transmission resource;
  ii) during one of the awake periods, receive signaling that defines the additional uplink allocation, the additional uplink allocation being allocated to occur during one of the awake periods defined for the mobile device; and
  iii) during one of the awake periods, transmitting the additional uplink packet or sub-packet on the additional uplink transmission resource.

* * * * *